(12) United States Patent
Sasagawa et al.

(10) Patent No.: US 6,738,116 B2
(45) Date of Patent: May 18, 2004

(54) REFLECTIVE LIQUID CRYSTAL DISPLAY DEVICE

(75) Inventors: Tomohiro Sasagawa, Toyko (JP); Akimasa Yuuki, Tokyo (JP); Toshio Tobita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 204 days.

(21) Appl. No.: 09/969,509

(22) Filed: Oct. 3, 2001

(65) Prior Publication Data

US 2002/0067447 A1 Jun. 6, 2002

(30) Foreign Application Priority Data

Dec. 1, 2000 (JP) ........................................ 2000-366810

(51) Int. Cl.[7] ........................................... G02F 1/1335
(52) U.S. Cl. ......................... 349/113; 349/62; 349/63; 349/65
(58) Field of Search ........................... 349/62, 63, 65, 349/113

(56) References Cited

U.S. PATENT DOCUMENTS

| 4,373,282 | A | * | 2/1983 | Wragg ...................... 40/546 |
| 6,108,059 | A | | 8/2000 | Yang |
| 6,151,089 | A | * | 11/2000 | Yang et al. ................ 349/113 |
| 6,222,689 | B1 | | 4/2001 | Higuchi et al. |
| 2001/0035927 | A1 | * | 11/2001 | Sasagawa ................. 349/113 |

FOREIGN PATENT DOCUMENTS

| DE | 3233301 | | 3/1984 |
| EP | 843 195 | | 5/1998 |
| EP | 879991 | | 11/1998 |
| EP | 1170623 | * | 1/2002 |
| GB | 2 192 084 | * | 12/1987 |
| JP | 60-233624 | | 11/1985 |
| JP | 8-94844 | * | 4/1996 |
| JP | 08-094844 | | 12/1996 |
| JP | 10-254371 | | 9/1998 |
| JP | 11-242220 | | 9/1999 |
| JP | 11-259007 | | 9/1999 |

* cited by examiner

*Primary Examiner*—Nathan J. Flynn
*Assistant Examiner*—Ahmed N. Sefer
(74) *Attorney, Agent, or Firm*—Leydig, Voit & Mayer, Ltd.

(57) ABSTRACT

A reflective liquid crystal display device having a structure providing high contrast even if there is undesired light. The structure includes a light-guiding plate for receiving, from a light-incident surface, light coming from a light source, and for allowing the light to exit from a bottom surface; a reflective liquid crystal display panel opposed to the bottom surface of the light-guiding plate; and a prism disposed on the side of a top surface of an upper substrate of the liquid crystal display panel. The prism has a surface that is substantially perpendicular to the top surface of the upper substrate, and a tilted surface which is tilted towards a side opposite to the light source from a crest line of the substantially perpendicular surface at a tilt angle with respect to an imaginary surface which passes through the crest line and which is parallel to the top surface of the upper substrate.

16 Claims, 10 Drawing Sheets

REFLECTIVE LIQUID CRYSTAL DISPLAY DEVICE

BACKGROUND OF THE INVENTION

1. Field of the Invention

The present invention relates to a reflective liquid crystal display device.

2. Description of the Related Art

In a reflective liquid crystal display device, the brightness of a screen is obtained by reflecting external light such as sunlight or indoor light. However, in the case where only reflected external light is used, when the screen cannot be made sufficiently bright at a place where there is not much external light, the amount of reflected external light is supplemented by disposing a flat light source device (hereinafter referred to as "front light") using a transparent plate at a display surface side of a liquid crystal display panel.

FIG. 17 schematically illustrates the structure of a conventional reflective liquid crystal display device using a front light. A structure similar to this is disclosed in, for example, Japanese Unexamined Patent Application Publication No. Hei. 8-94844(1996). In FIG. 17, reference numeral 1 denotes a reflective liquid crystal display panel, and reference numeral 1a denotes a display surface which is the surface that an observer looks at in order to look at an image produced on the liquid crystal display panel 1. Reference numeral 2 denotes a light-guiding plate disposed on the side of the display surface 1a of the liquid crystal display panel 1. A prism array 2b is formed at a side opposite to the side of a bottom surface 2a opposing the display surface 1a of the liquid crystal display panel 1. In the prism array 2b, crest lines T and trough lines V, which extend in a perpendicular direction with respect to the plane of the figure and which are parallel to each other, are alternately provided. As shown in FIG. 17, a tilt angle α of a tilted surface S1 of the prism array 2b is, for example, approximately 45 degrees, while a tilt angle β of a tilted surface S2 is, for example, equal to or less than 10 degrees.

Reference numeral 3 denotes a light source disposed beside a light-incident surface 2c of the light-guiding plate 2, and reference numeral 4 denotes a reflector for reflecting light generated from the light source 3 to efficiently cause the light to be incident upon the light-guiding plate 2 from the light-incident surface 2c. Reference numeral 5 denotes a reflecting plate disposed so that the light from the light source 3 does not exit from surfaces of the light-guiding plate 2 other than the bottom surface 2a and the surface of a prism array 2b. The front light is formed by the light-guiding plate 2, the light source 3, the reflector 4, and the reflecting plate 5.

A description of an optical path from where light is generated from the light source 3 to where it exits from the display surface of the liquid crystal display device will now be given.

The light generated from the light source 3 is directly reflected or reflected by the reflector 4, and impinges upon the light-guiding plate 2 from the light-incident surface 2c. The light incident upon the light-incident surface 2c while repeatedly being subjected to total reflection due to the difference between the refractive indices of the light-guiding plate 2 and air is transmitted through the inside of the light-guiding plate 2 towards the opposite side of the lamp 3. When the light strikes the tilted surface S1 of the prism array 2b, it is reflected in a direction substantially perpendicular to the bottom surface 2a, so that the condition for total reflection of light inside the light-guiding plate 2 is broken, causing the light to exit from the bottom surface 2a. The light which has exited from the bottom surface 2a is incident upon the liquid crystal display panel 1, is modulated by a liquid crystal layer (not shown) of the liquid crystal display panel, and is reflected by a reflecting surface (not shown) of the liquid crystal display panel. Thereafter, the light passes through the light-guiding plate 2 again, and exits therefrom in the direction of the observer at the display surface side. Reflected light is produced at the bottom surface 2a of the light-guiding plate 2 or the display surface 1a of the liquid crystal display panel 1.

In the conventional reflective liquid crystal display device, external light and light from the light source 3 are not only reflected at the reflecting surface of the reflective liquid crystal display panel 1, but also reflected at the bottom surface 2a of the light-guiding plate 2 and the display surface 1a of the liquid crystal display panel 1. Therefore, the light becomes undesired reflected light not carrying image information (hereinafter referred to as "undesired light") as a result of not passing through the liquid crystal layer of the liquid crystal display panel 1, thereby resulting in the problem that contrast is reduced.

A method of overcoming the above-described problem is disclosed in, for example, Japanese Unexamined Patent Application Publication No. Hei. 11-242220(1999). In this document, the method provides a reflection preventing film at the bottom surface 2a of the light-guiding plate. The document proposes to overcome the problem of reduced contrast of the displayed image caused by the reflection at the bottom surface 2a when light exits from the light-guiding plate 2 by providing the reflection preventing film. However, even when the reflection preventing film is provided, the reflection of undesired light of the order of 0.5% occurs, thereby resulting in the problem that sufficient contrast cannot be obtained.

SUMMARY OF THE INVENTION

Accordingly, the present invention has been achieved to overcome the above-described problem, and has as its object the provision of a reflective liquid crystal display device which can provide high contrast even when there is undesired light.

To this end, according to one aspect of the present invention, there is provided a reflective liquid crystal display device including a light source; a light-guiding plate, in which light from the light source is received from a side surface of the light-guiding plate, and in which the light exits from a bottom surface of the light-guiding plate; and a reflective liquid crystal display panel disposed so as to be parallel to and so as to oppose the bottom surface of the light-guiding plate, the reflective liquid crystal display panel having a liquid crystal layer sandwiched between an upper substrate and a lower substrate. In the reflective liquid crystal display device, a deflecting device for deflecting the light which has exited from the bottom surface of the light-guiding plate is provided at a top surface side of the upper substrate of the reflective liquid crystal display panel. Thus, the light from the light source exiting from the bottom surface of the light-guiding plate can be reflected by the deflecting device in a direction that is tilted from the vertical direction, which is the visual recognition direction. Therefore, it is possible to provide high contrast.

According to another aspect of the present invention, there is provided a reflective liquid crystal display device including a reflective liquid crystal display panel having a liquid crystal layer sandwiched between an upper substrate and a lower substrate. In the reflective liquid crystal display device, a deflecting device for deflecting light incident from a top surface side of the upper substrate is provided at the top surface side of the upper substrate of the reflective liquid crystal display panel. Thus, external light can be reflected at the deflecting device in a direction that is tilted from the vertical direction, which is the visual recognition direction. Therefore, it is possible to provide high contrast.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
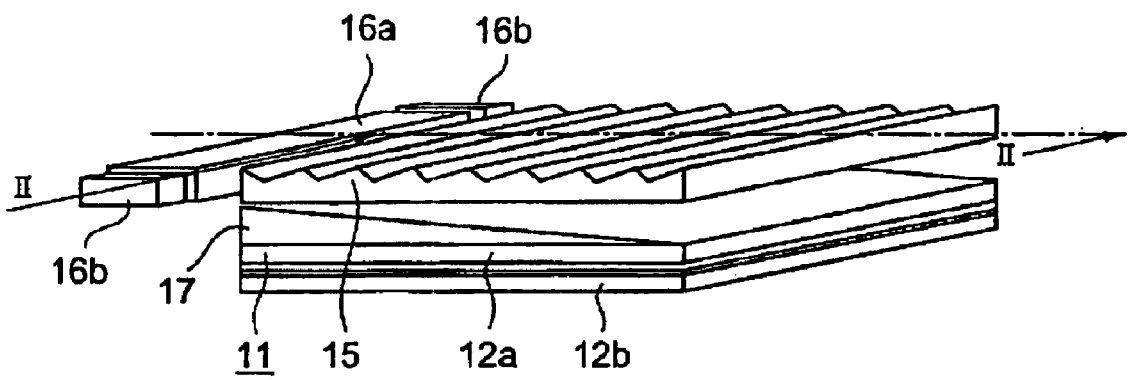
FIG. 1 is a perspective view schematically illustrating the structure of a first embodiment of a reflective liquid crystal display device in accordance with the present invention.
Figure 2:
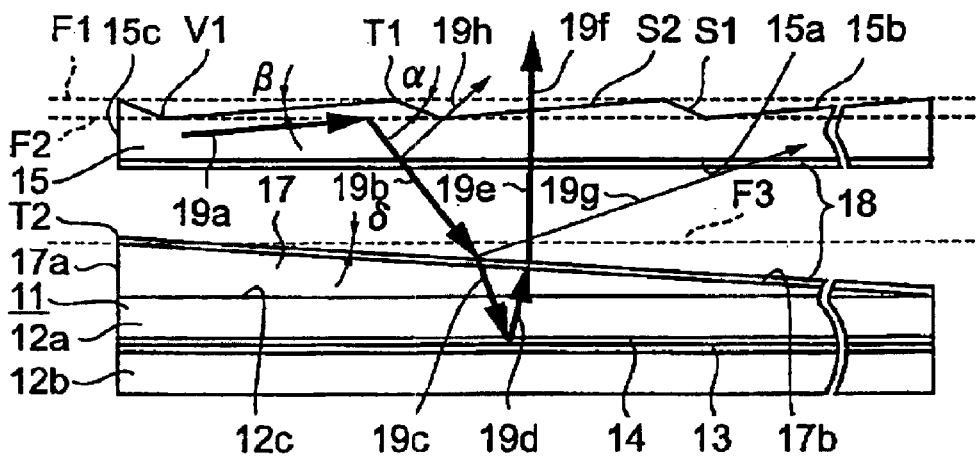
FIG. 2 is a partial cross-sectional view taken in the direction of arrows along line II—II of FIG. 1 showing the first embodiment of the reflective liquid crystal display device.

FIG. 1 is a perspective view schematically showing the structure of a first preferred embodiment of a reflective liquid crystal display device. FIG. 2 is a partial cross-sectional view taken in the direction of arrows along line II—II of FIG. 1 showing the reflective liquid crystal display device. In FIGS. 1 and 2, reference numeral 11 denotes a reflective liquid crystal display panel; and reference numerals 12a and 12b denote a transparent upper substrate and a transparent lower substrate, respectively, both of which are formed of, for example, acrylic material or glass. A reflecting surface 13 is formed at a surface of the lower substrate 12b opposing the upper substrate 12a. Reference numeral 14 denotes a liquid crystal layer disposed between the upper substrate 12a and the lower substrate 12b. The reflective liquid crystal display panel 11 is formed by the upper substrate 12a, the lower substrate 12b, the reflecting surface 13, and the liquid crystal layer 14.

The liquid crystal display panel 11 also provides the following structural members that are not shown. They include, at the upper substrate or the lower substrate, an array substrate and an opposing substrate, where a color filter, a transistor, an electrode (such as a pixel electrode), and a wiring are formed; a spacer which keeps the two substrates 12a and 12b separated by a constant distance; a sealing material which joins the two substrates 12a and 12b together; a sealant which seals-the portion between the two substrates 12a and 12b after injecting liquid crystals therebetween; an orientation film for initially orienting the liquid crystals; and a polarizing plate which polarizes light.

Reference numeral 15 denotes a light-guiding plate disposed on the side of a top surface 12c of the upper substrate 12a. A prism array 15b is formed on a surface of the light-guiding plate 15 opposite to a bottom surface 15a opposing the liquid crystal display panel 11. In the prism array 15b, crest lines T1 and trough lines V1, which extend in a perpendicular direction with respect to the plane of the figure and which extend parallel to each other, are alternately provided. A surface which includes all of the crest lines T1 in the same plane is defined as an imaginary surface F1, whereas a surface which includes all of the trough lines V1 in the same plane is defined as an imaginary surface F2. S1 denotes a reflecting surface which forms an angle a with respect to the imaginary surface F1, whereas S2 denotes a transmitting surface which forms an angle β with respect to the imaginary surface F1. Reference numeral 15c denotes a light-incident surface opposing a light-incoming-portion light-guiding member (described later), and receiving light from the light-incoming-portion light-guiding member. The tilt angles α and β are angles which break the total reflection condition of light transmitted inside the light-guiding plate 15. The tilt angle α is less than 48 degrees, such as 45 degrees, while the tilt angle β is equal to or less than 10 degrees. Reference numeral 16a denotes a light-incoming-portion light-guiding member disposed so as to oppose the light-incident surface 15c of the light-guiding plate 15.

Light-emitting diodes 16b (hereinafter referred to as "LED"), serving as light sources, are disposed on both ends of the light-incoming-portion light-guiding member 16a. The light-guiding plate 15, the light-incoming-portion light-guiding member 16a, and the LEDs 16b form a front light.

Reference numeral 17 denotes a prism, serving as a deflecting device, which is provided on the side of the top surface 12c of the upper substrate 12a of the liquid crystal display panel 11. The prism 17 is formed of a material having an index of refraction that is of the order of the index of refraction of the upper substrate 12a of the liquid crystal display panel 1 or a deflecting plate (not shown), and deflects light which has exited from the bottom surface 15a of the light-guiding plate 15. Reference numeral 17a denotes a light-source-side surface that is substantially perpendicular to the top surface 12c of the upper substrate 12a of the liquid crystal display panel 11. Reference numeral 17b denotes a tilted surface which tilts towards a side opposite to the light sources from a crest line T2 at a tilt angle δ with respect to an imaginary surface F3 which passes through the crest line T2 of the substantially perpendicular surface 17a and which is parallel to the top surface 12c of the upper substrate 12a. Reference numeral 18 denotes a non-reflective film which coats the bottom surface 15a of the light-guiding plate 15 and the tilted surface 17b of the prism 17, so that the surfaces 15a and 17b are subjected to a reflection prevention processing operation by, for example, a vacuum deposition method, a dipping method, or a thermal transfer method.

A description of an optical path where light generated from the LEDs 16b passes through the liquid crystal display panel 11 and exits from the prism array 15b of the light-guiding plate 15 will now be given. The reference numerals in parentheses denote portions of the optical path.

Light generated from the LEDs 16b is incident upon the light-incoming-portion light-guiding member 16a. The light incident upon the light-incoming-portion light-guiding member 16a is while being repeatedly subjected to total reflection due to the difference between the refractive indices of the light-incoming-portion light-guiding member 16a and air is transmitted through the inside of the light-incoming-portion light-guiding member 16a. All of the light incident upon the light-incoming-portion light-guiding member 16a satisfy the total reflection conditions, and, thus, does not leave the light-incoming-portion light-guiding member 16a. However, by providing a light taking-out portion (not shown) having protrusions and depressions at a surface of the light-incoming-portion light-guiding member 16a opposite to the surface thereof facing the light-incident surface 15c of the light-guiding plate 15, the total reflection conditions for light inside the light-incoming-portion light-guiding member 16a are broken, so that the light exits from the light-incoming-portion light-guiding member 16a and impinges upon the light-incident surface 15c.

The light incident upon the light-incident surface 15c of the light-guiding plate 15 is while being repeatedly subjected to total reflection due to the difference between the refractive indices of the light-guiding plate 15 and air is transmitted through the inside of the light-guiding plate 15 towards the side opposite to the light-incident surface 15c (as shown by arrow 19a). When the light strikes the reflecting surface S1 of the prism array 15b of the light-guiding plate 15, which is disposed at, for example, an angle α nearly equal to 45 degrees, it is reflected in a direction substantially perpendicular to the bottom surface 15a of the light-guiding plate 15, so that the total reflection conditions of light inside the light-guiding plate is broken, thereby causing the light to exit from the bottom surface 15a of the light-guiding plate 15 (as shown by arrow 19b).

The light-guiding plate 15 is formed of a transparent material having high light transmittance, such as polymethylmethacrylate (PMMA), polycarbonate (PC), or glass. When the light-guiding plate 15 is formed of acrylic resin, the refractive index thereof is 1.492. The angle α range of the reflecting surface S1 and the angle β range of the transmitting surface S2 of the prism array 15b with respect to the imaginary surface F1 are, respectively, ideally less than 48 degrees as an angle α for causing violation of the total reflection conditions, and equal to or less than 10 degrees as a practical angle β range.

The exiting light (represented by arrow 19b) from the bottom surface 15a of the light-guiding plate 15 impinges upon the tilted surface 17b of the prism 17 (represented by arrow 19c). Here, the difference between the refractive indices of air and the prism 17 causes the light to be refracted at the tilted surface 17b and, thus, to change directions. Thereafter, the light which has impinged upon the tilted surface 17b passes through the upper substrate 12a of the liquid crystal display panel 11 (as shown by arrow 19c) in order to be spacially modulated at the liquid crystal layer 14, and is reflected by the reflecting surface 13 of the lower substrate 12b. The light which has passed through the liquid crystal layer 14 and the upper substrate 12a (as shown by arrow 19d) is refracted again by the tilted surface 17b and exits from the liquid crystal display panel 11 (as shown by arrow 19e). In this way, the light passes through the light-guiding plate 15 in order to display an image obtained at the liquid crystal display panel 11 in the direction of the observer, which corresponds to the direction towards the side of the imaginary surface F1.

In the first embodiment, by forming the prism 17 on the side of the top surface 12c of the upper substrate 12a of the liquid crystal display panel 11, the reflected light at the tilted surface 17b of the prism 17 is at an angle with respect to a direction perpendicular to the top surface 12c (as shown by arrow 19g). The prism 17 is made to function so that the direction in which the light reflected at the reflecting surface 13 of the liquid crystal display panel 11 exits from the prism 17 is such that the light is deflected substantially perpendicular to the top surface 12c of the upper substrate 12a (as shown by arrow 19e). This makes it possible for the reflected light at the surface of the liquid crystal display panel 11 (shown by arrow 19g) and the reflected light at the reflecting surface 13 (shown by the arrow 19d) to be separated from each other. In other words, the reflected light (shown by the arrow 19g) which is undesired light not carrying image information and the reflected light (shown by the arrow 19d) which carries image information can be separated from each other, thereby making it possible to provide high contrast.

Although the light sources have been described as being LEDs used in movable devices such as portable telephones or personal digital assistants (PDA), the light sources used in the present invention are not limited to LEDs. Other types of light sources which may also be used are incandescent lamps and fluorescent lamps, including hot cathode tubes and cold cathode tubes, and devices in which organic light-emitting materials are formed into the shape of wires.

In order to facilitate the production of the reflective liquid crystal display panel, the prism 17 may be adhered to the surface of the reflective liquid crystal display panel 11 as a separate member. For example, since the prism 17 can be formed on a film by molding out a UV curable resin, the prism 17 can be bonded to the liquid crystal display panel using an adhesive. In this case, when the refractive index of the adhesive or the base material used during the formation of the film greatly differs from the refractive index of the material of the surface of the liquid crystal display panel, interfacial reflection occurs, so that it is necessary to make the difference between the refractive indices as small as possible.

Even if the non-reflective film 18 is not applied to the bottom surface 15a of the light-guiding plate 15 and the tilted surface 17b, compared to a conventional reflective liquid crystal display device, the reflective liquid crystal display device of the first embodiment provides a high display contrast because the effects of undesired light is small. By applying the non-reflective film 18 to each surface, the reflectivity of undesired light at each surface can be kept to a minimum.

The upper substrate 12a and the lower substrate 12b, which sandwich the liquid crystal layer 14, are not limited to transparent substrates formed of, for example, glass. The upper substrate 12a may be a translucent substrate, while the lower substrate 12b may be a non-translucent substrate.

As long as the screen of the reflective liquid crystal display panel can be made sufficiently bright using external light, a front light does not have to be provided in the reflective liquid crystal display device.

A description of examples of the first embodiment of the reflective liquid crystal display device will now be given.

Figure 3:
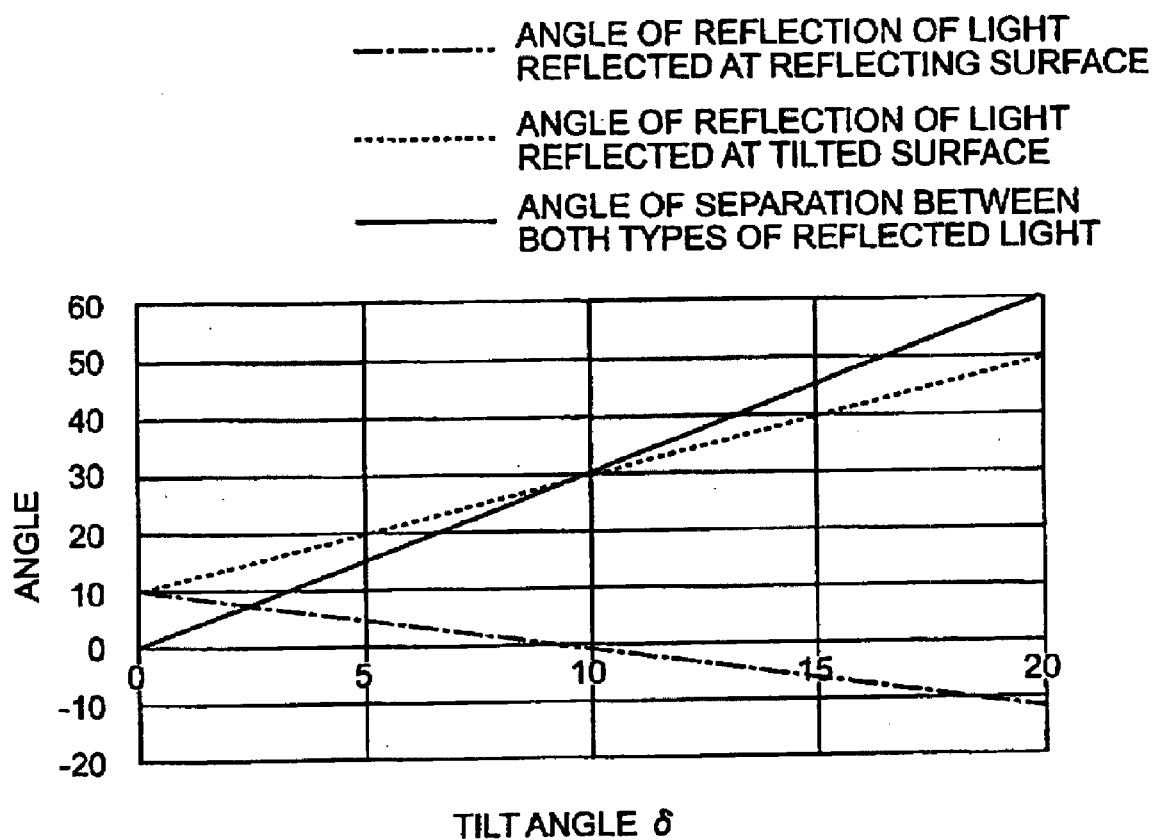
FIG. 3 is a graph showing, in terms of a tilt angle δ of a prism, the angle of reflection of light reflected at a reflecting surface, the angle of reflection of light reflected at a tilted surface, and the angle of separation between both of these types of reflected light.

FIG. 3 is a plot of the calculation of the angle of reflection of the reflected light (represented by the arrow 19g) at the tilted surface 17b of the prism 17 formed at a tilt angle δ, the angle of reflection of the reflected light (represented by the arrow 19d) at the reflecting surface 13, and the angle of separation between both of these types of light (represented by the arrows 19d and 19g), in the case where light exits from the front light at a tilt angle of 10 degrees with respect to a line perpendicular to the bottom surface 15a.

Figure 4:
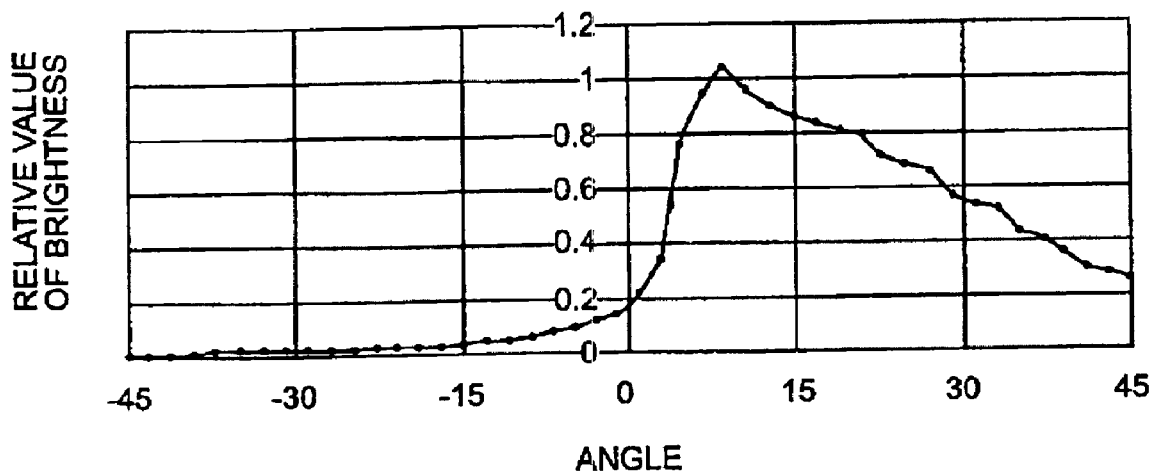
FIG. 4 is a graph showing the angle distribution of exiting light from a front light.

FIG. 4 is a plot of the results of a simulation of the angle distribution of light which exits from the bottom surface 15a of the light-guiding plate after being reflected at the reflecting surface S1 of the light-guiding plate, in the case where the angle a of the reflecting surface S1 of the light-guiding plate 15 is 40 degrees. In FIG. 4, the horizontal axis represents the angle of the exiting light, and, with the vertically downward direction in the plane of FIG. 2 serving as a reference, and the light-incident surface 15c side of the light-guiding plate 15 serving as a negative region, the coordinates are determined.

Figure 5:
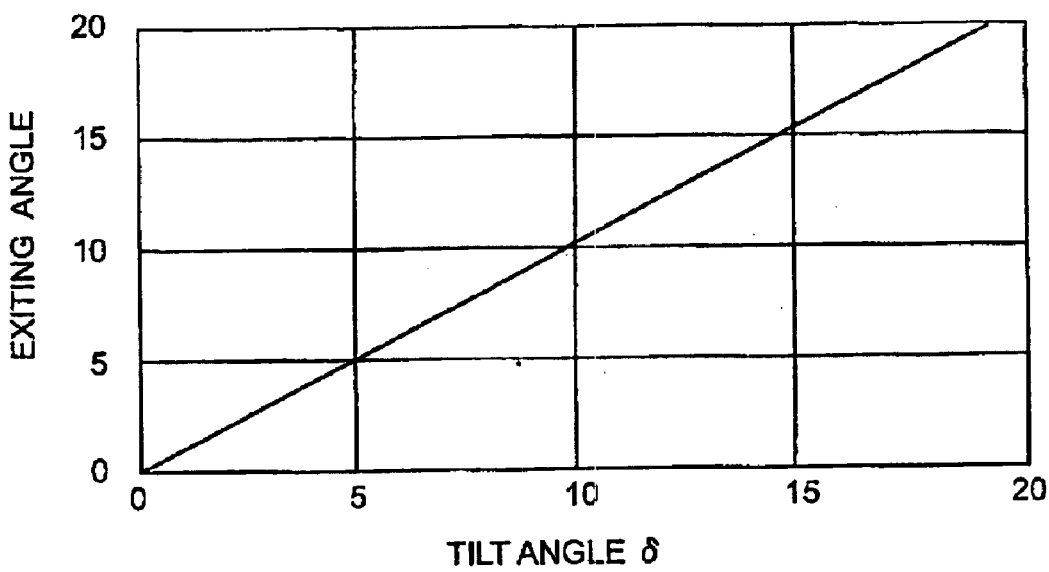
FIG. 5 is a graph showing, in terms of the tilt angle δ of the prism, the exiting angle of light from the front light set so that the direction of reflection at the reflecting surface becomes perpendicular.

FIG. 5 is an illustration of a plot of the exiting angle from the front light that causes the light reflected at the reflecting surface 13 to be in a vertical direction, in terms of the tilt angle δ of the tilted surface 17b of the prism 17.

Figure 6:
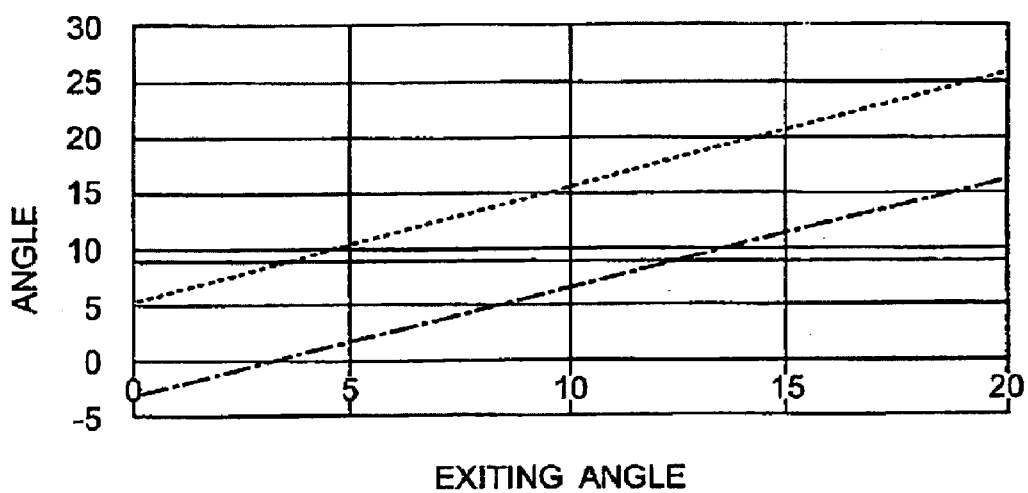
FIG. 6 is a graph showing, in terms of the exiting angle of light from the front light, the angle of reflection of the light reflected at the reflecting surface, the angle of reflection of the light reflected at the tilted surface, and the angle of separation between both of these types of reflected light, when the tilt angle δ of the prism is constant.

FIG. 6 illustrates a plot of the angle of reflection of the reflected light (represented by the arrow 19g) at the tilted surface 17b of the prism 17, the angle of reflection of the reflected light (represented by the arrow 19d) at the reflecting surface 13, and the angle of separation between both types of reflected light (represented by the arrows 19d and 19g), in terms of the exiting angle of the exiting light (represented by the arrow 19b) from the front light, in the case where the tilt angle δ of the tilted surface 17b of the prism 17 is 3 degrees.

Figure 7:
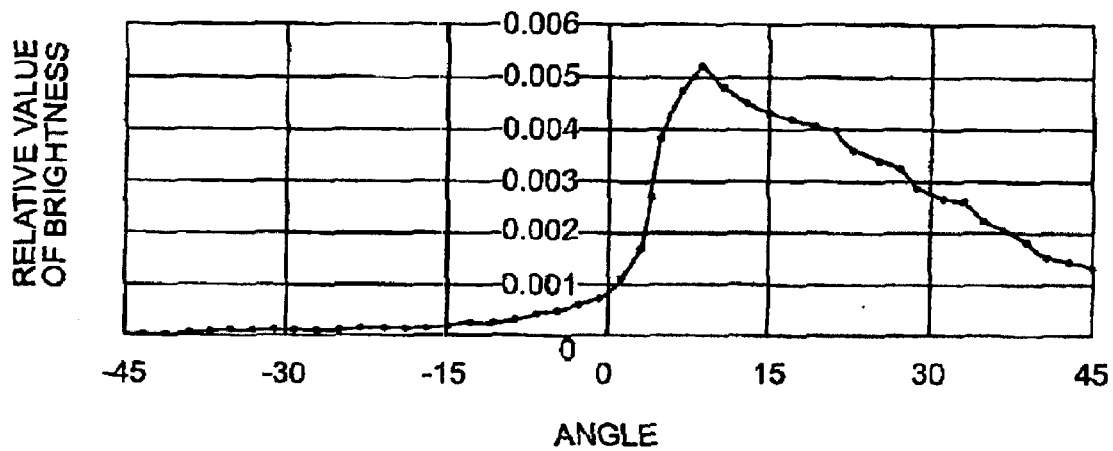
FIG. 7 is a graph showing the angle distribution of light reflected at a bottom surface of a light-guiding plate.

FIG. 7 is an illustration of a plot of the results of a simulation of the angle distribution of the reflected light (represented by the arrow 19h) from the bottom surface 15a of the light-guiding plate 15.

Figure 8:
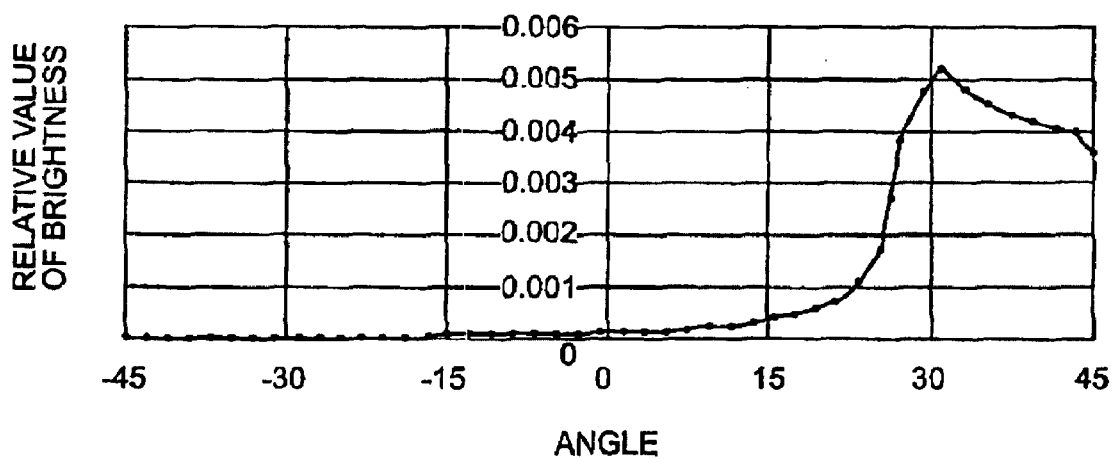
FIG. 8 is a graph showing the angle distribution of light reflected at the tilted surface of the prism.

FIG. 8 is an illustration of a plot of the results of a simulation of the angle distribution of the reflected light (represented by the arrow 19g) from the tilted surface 17b of the prism 17. In FIGS. 7 and 8, each horizontal axis represents the angle, and, with the vertically upward direction in the plane of FIG. 2 serving as a reference, and the light-incident surface 15c side of the light-guiding plate 15 serving as a negative region, the coordinates are determined.

As can be seen from FIG. 3, when the tilt angle δ is 0 degrees, that is, when the prism 17 is not formed, the reflected light (represented by the arrow 19g) at the tilted surface 17b of the prism 17 and the reflected light (represented by the arrow 19d) at the reflecting surface 13 are light specularly reflected in the same direction. As the tilt angle δ increases, the directions of reflection of both types of reflected light become increasingly separated from each other. When the tilt angle δ is approximately 10 degrees, the light (represented by the arrow 19d) at the reflecting surface 13 is reflected in a direction substantially perpendicular to the top surface 12c (that is, the angle of reflection of the reflected light at the reflecting surface is zero degrees).

Accordingly, in the case where the prism 17 is tilted at a tilt angle δ of 10 degrees when the light exits from the front light at a tilt angle of 10 degrees, the light which passes through the liquid crystal layer 14 and, thus, carries image information is reflected at the reflecting surface 13 in a vertical direction, which is the visual recognition direction. The reflected light (represented by the arrow 19g) at the tilted surface 17b of the prism 17 is greatly shifted by an angle of 30 degrees from the visual recognition direction. Therefore, it can be understood that the reflected light (represented by the arrow 19g) virtually does not have any effect in the visual recognition direction. The light (represented by the arrow 19h) reflected at the bottom surface 15a of the light-guiding plate 15 is specularly reflected at a mirror surface that is not tilted, so that it is reflected at an angle of 10 degrees. The reflected light (represented by the arrow 19h) does not also have any effect in the visual recognition direction. In other words, by providing the prism 17, it is possible to obtain high contrast in the visual recognition direction even when there is undesired light.

It can be seen from FIG. 5 that the light (represented by the arrow 19b) that exits from the bottom surface 15a of the light-guiding plate 15 at an exiting angle which is substantially equal to the tilt angle δ of the tilted surface 17b of the prism 17 passes through the liquid crystal layer 14 and is reflected at the reflecting surface 13 in a perpendicular direction. Therefore, by making the tilt angle δ and the exiting angle of the light (represented by the arrow 19b) exiting from the bottom surface 15a of the light-guiding plate 15 equal to each other, the brightness of the light which has exited from the bottom surface 15a of the light-guiding plate 15 and which has been deflected by the reflective liquid crystal display panel 11 can reach its peak value. Consequently, the exiting light from the front light is efficiently reflected in the perpendicular direction, which is the visual recognition direction, thereby making it possible to provide high-contrast.

It can be seen from FIG. 6 that when the tilt angle δ is constant, the separation angle stays substantially constant even when the angle of the exiting angle from the front light varies.

The non-reflective film 18 is applied to the bottom surface 15a of the light-guiding plate 15, serving as a mirror surface, and, as shown in FIG. 4, the light at the peak value reflected by the reflecting surface S1 of the light-guiding plate 15 exits at an angle of 10 degrees from the perpendicular direction. Therefore, the reflected light (represented by the arrow 19h) from the bottom surface 15a is at an angle of 10 degrees from the perpendicular direction (that is, the visual recognition direction) in the angle distribution shown in FIG. 7. Therefore, a reduction in the contrast of the image due to undesired light not carrying image information produced by reflection at the bottom surface 15a does not occur, so that the reflected light does not have a large effect in the visual recognition direction.

As shown in FIG. 4, since the light at the peak value reflected by the reflecting surface S1 of the light-guiding plate 15 exits at an angle of 10 degrees from the perpendicular direction, and is reflected at the tilted surface 17b of the prism 17, the reflected light (represented by the arrow 19g) is reflected with a large tilt from the perpendicular direction (that is, the visual recognition direction) within an angle distribution shown in FIG. 8. In addition, the reflectivity can be made small by the non-reflective films 18, thereby making it possible to make the effects of the reflected light (represented by the arrow 19g) extremely small.

As can be understood from the foregoing description, according to the reflective liquid crystal display device of the first preferred embodiment of the present invention, the reflected light (represented by the arrow 19d) at the reflecting surface 13 of the liquid crystal display panel 11 in the visual recognition direction and that carries image information, and the reflected light (represented by the arrow 19h) at the bottom surface 15a of the light-guiding plate 15 becoming undesired light for display not carrying image information, and the reflected light (represented by the arrow 19g) at the tilted surface 17b of the prism 17 are reflected in different directions. Therefore, in the visual recognition direction, the effects of the undesired light can be made small, thereby making it possible to provide high contrast.

Second Preferred Embodiment

Figure 9:
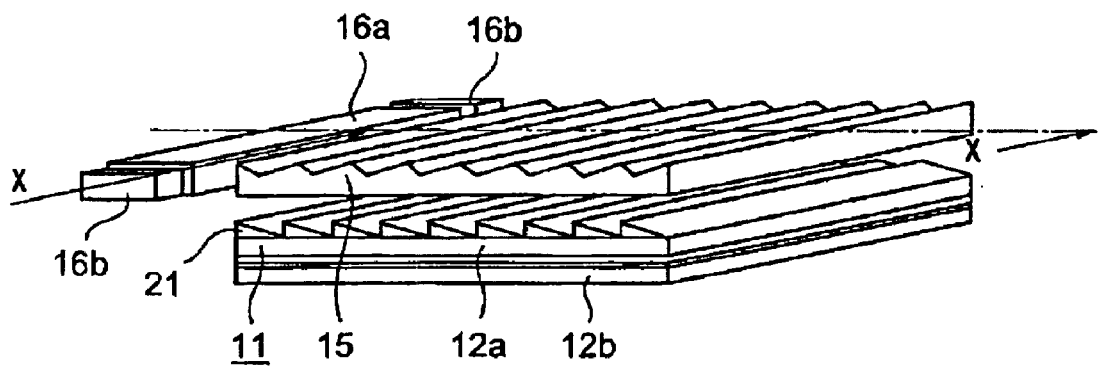
FIG. 9 is a perspective view schematically showing the structure of a second embodiment of a reflective liquid crystal display device in accordance with the present invention.
Figure 10:
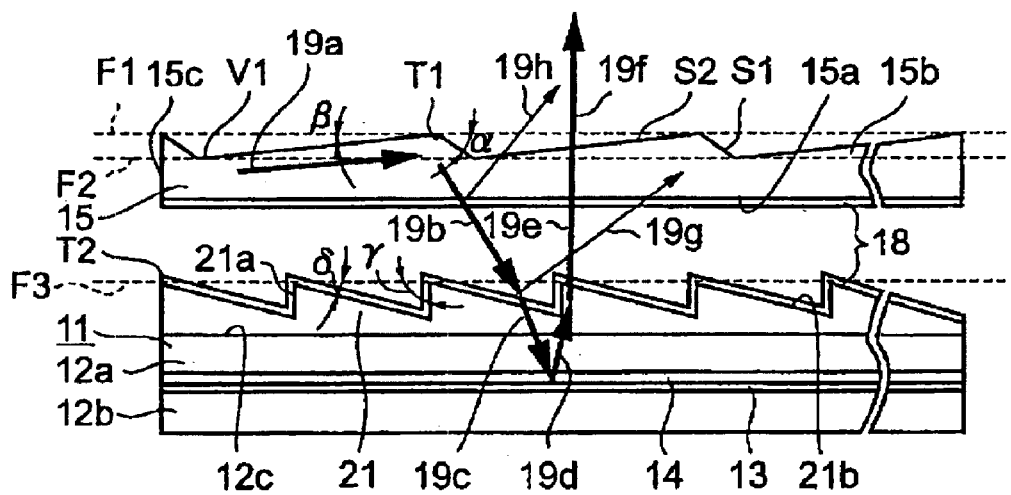
FIG. 10 is a partial cross-sectional view in the direction of arrows along line X—X of FIG. 9 showing the second embodiment of the reflective liquid crystal display device.

FIG. 9 is a perspective view schematically illustrating the structure of a second preferred embodiment of a reflective liquid crystal display device in accordance with the present invention. FIG. 10 is a partial cross-sectional view in the direction of arrows along line X—X of FIG. 9 showing the reflective liquid crystal display device. In FIGS. 9 and 10, the same reference numerals as those in FIGS. 1 and 2 denote corresponding or the same parts, which will not be described below. Reference numeral 21 denotes a prism array, serving as a deflecting device, provided on the side of a top surface 12c of an upper substrate 12a of a liquid crystal display panel 11. The prism array 21 is formed of a material having a refractive index of the same order as that of the upper substrate 12a or a deflecting plate (not shown), and is used to deflect light exiting from a bottom surface 15a of a light-guiding plate 15.

Reference numeral 21a denotes a plurality of light-source-side surfaces, each of which is substantially perpendicular to the top surface 12c of the upper substrate 12a of the liquid crystal display panel 11. Reference numeral 21b denotes a plurality of tilted surfaces, each of which tilts towards a side opposite to the light sources from each crest line T2 of its corresponding substantially perpendicular surface 21a at a tilt angle δ with respect to an imaginary surface F3 which passes through each crest line T2 of its corresponding substantially perpendicular surface 21a and which is parallel to the top surface 12c of the upper substrate 12a. In the second embodiment, the angle δ is 10 degrees. In the prism array 21, the crest lines T2 and trough lines V2 extending in a perpendicular direction in the plane of the figure and extending parallel to each other are alternately formed.

The second embodiment only differs from the first embodiment in that it has the prism array 21. Other than the operational effects provided by the prism array 21 (described later), the second embodiment provides the same operational effects as the first embodiment.

In the first embodiment, the structure provides a single prism 17 as shown in FIG. 2. Therefore, in order to provide a sufficient tilt angle δ, the prism 17 is made thick, thereby making it difficult to reduce the size and weight of the display device. However, in the second embodiment, as shown in FIGS. 9 and 10, the structure provides the prism array 21 having a plurality of prisms repeatedly disposed, so that the prism array 21 can be made thin, thereby making it possible to reduce the size and weight of the display device.

In the second embodiment, since the structure comprises the prism array 21 disposed at the surface of the liquid crystal display panel 11, when light from a front light is incident upon the substantially perpendicular surfaces 21a of the prism array 21, the light is reflected in directions that are different from the directions in which the light is reflected when it is incident upon the tilted surfaces 21b, so that there is a loss of light. In order to make the loss of light as small as possible, the areas of the tilted surfaces 21b opposing the bottom surface 15a of the light-guiding plate 15 are made large so as to reduce the amount of light incident upon the substantially perpendicular surfaces 21a. In other words, each substantially perpendicular surface 21a is formed at an angle γ, which is a substantially vertical angle.

Figure 11:
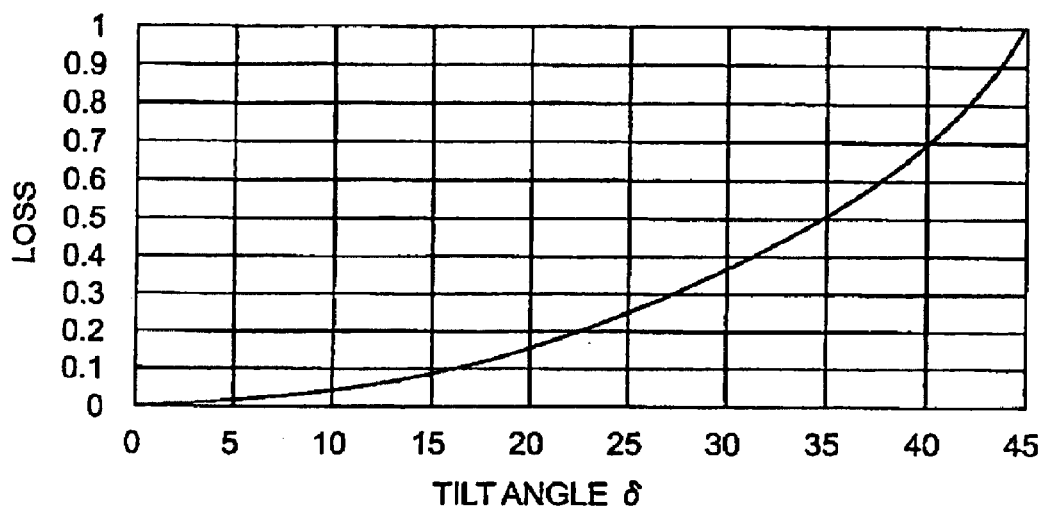
FIG. 11 is a graph showing the relationship between the loss of light in terms of a tilt angle of a tilted surface of a prism array.

FIG. 11 is an illustration of a plot of the proportion of the loss of light due to the substantially perpendicular surfaces 21a when the light exits from the front light at an exiting angle equal to the tilt angle δ, in terms of the tilt angle δ of the tilted surfaces 21b of the prism array 21.

As shown in FIG. 11, when the loss of light increases as the tilt angle δ increases, and the tilt angle δ becomes 45 degrees, all of the light incident upon the prism array 21 is lost, so that the tilt angle δ must be less than 45 degrees. In order to increase the proportion of exiting light (represented by arrow 19b) from the front light that is incident upon the tilted surfaces 21b so as to restrict the loss of light, it is preferable to make the tilt angle δ as small as possible within the range in which high contrast can be provided.

Unevenness in the display may result from interference of the gaps between the plurality of adjacent prisms of the prism array 21 with the gaps between adjacent pixels of the liquid crystal display panel 11 and the gaps between adjacent prisms of a prism array 15b of the light-guiding plate 15. Therefore, it is preferable that the gaps between adjacent prisms of the prism array be the same as or smaller than the gaps between the pixels, that is, equal to or less than 50 microns if possible.

In order to make clear the differences between the reflective liquid crystal display device of the embodiments of the present invention and a conventional reflective liquid crystal display device, the differences will be described using the following comparative examples.

COMPARATIVE EXAMPLE 1

Figure 12:
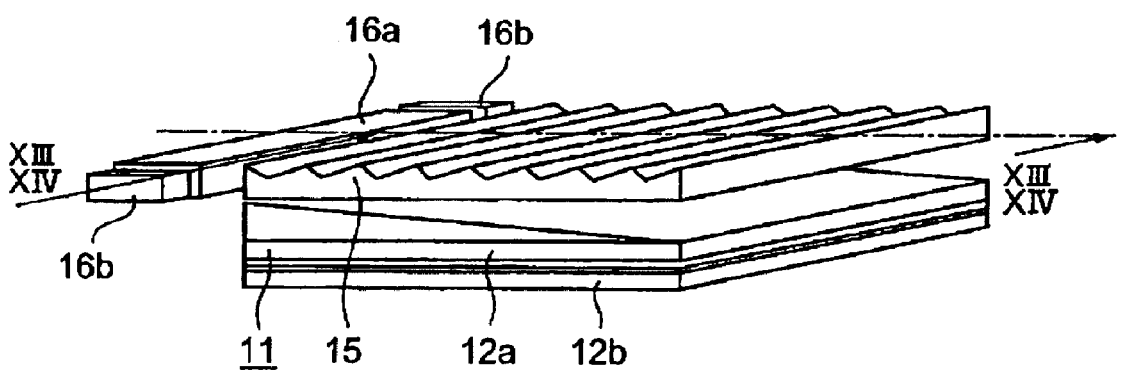
FIG. 12 is a perspective view schematically showing the structure of a conventional reflective liquid crystal display device.
Figure 13:
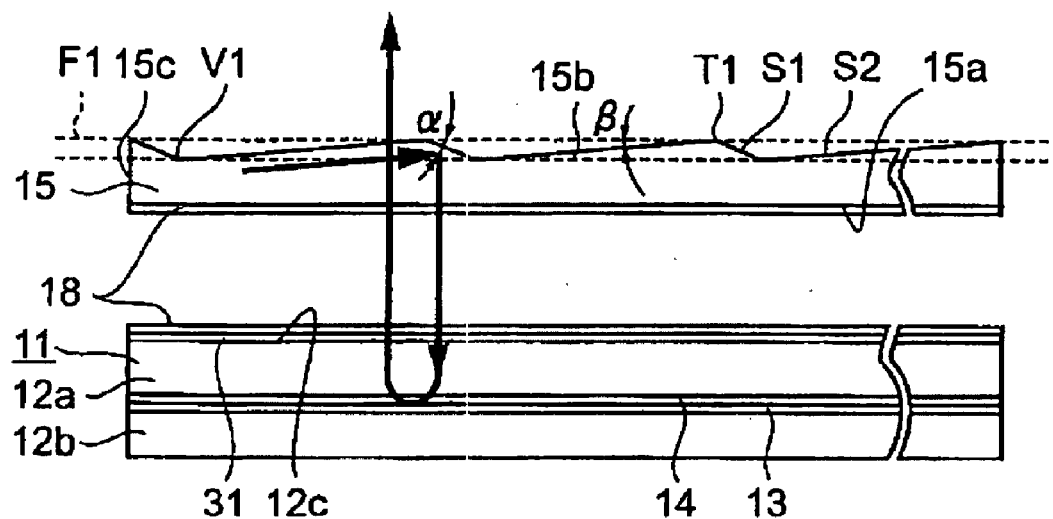
FIG. 13 is a partial cross-sectional view in the direction of arrows along line XIII—XIII of FIG. 12 showing the conventional reflective liquid crystal display device.

FIG. 12 is a perspective view schematically showing the structure of another conventional reflective liquid crystal display device. FIG. 13 is a partial cross-sectional view in the direction of arrows along line XIII—XIII of FIG. 12 showing the conventional reflective liquid crystal display device. Angle α of a reflecting surface of a light-guiding plate is set at 45 to 46 degrees so that the light from a front light exits vertically towards the reflective liquid crystal display panel. In FIGS. 12 and 13, the same reference numerals as those used in FIGS. 1 and 2 denote the same or corresponding parts, which will not be described below. Reference numeral 31 denotes a portion subjected to an anti-glare processing operation, and, by providing, for example, protrusions and depressions at a top surface 12c of an upper substrate 12a, specular reflection is reduced.

In Comparative Example 1, in the case where the observer visually perceives an image produced in the conventional reflective liquid crystal display device from the vertical direction, the light reflected in the specular reflection direction at a bottom surface 15a of a light-guiding plate 15 and a top surface 12c of an upper substrate 12a of the liquid crystal display panel 11 is reflected in the vertical direction, which is the same as the visual recognition direction. The bottom surface 15a is required to be a mirror surface from the viewpoint of functioning as a light-guiding plate, and when, the scattering property of the top surface 12c is increased, a problem such as an unsharp display occurs, so that the bottom surface 15a and the top surface 12c are formed into surfaces nearly like mirror surfaces. The proportion of light reflected in the specular reflection direction by the bottom surface 15a of the light-guiding plate 15 and the top surface 12c of the upper substrate 12a of the liquid crystal display panel 11 is large, so that contrast in the visual recognition direction is greatly reduced. Even when a non-reflective film 18 is applied to each of these surfaces 15a and 12c, a reflection of the order of 0.5% with respect to one surface generally occurs, so that reflection of 1% occurs at the two surfaces. In other words, when compared to the reflectivity of the order of 10% of a generally used reflective liquid crystal display panel, a low contrast of the order of 10 can only be obtained at most.

COMPARATIVE EXAMPLE 2

Figure 14:
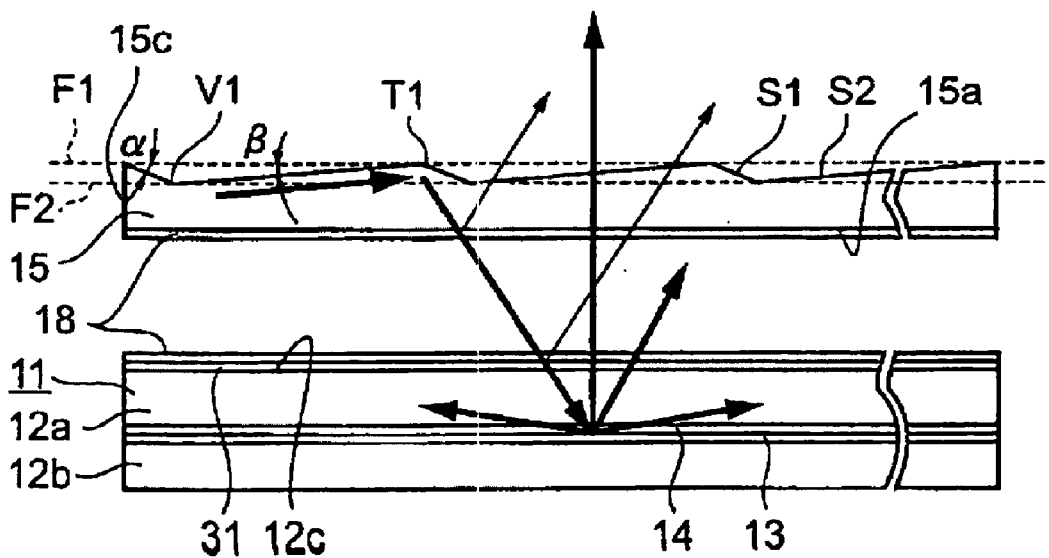
FIG. 14 is a partial cross-sectional view in the direction of arrows along line XIV—XIV of FIG. 12 showing the conventional reflective liquid crystal display device whose reflecting surface is provided with scattering properties.

FIG. 14 is a partial cross-sectional view in the direction of arrows along line XIV—XIV of FIG. 12 showing the conventional reflective liquid crystal display device, in which a reflecting surface 13 of the reflective liquid crystal display panel 11 is provided with a scattering property so that the light from the front light exiting from the reflective liquid crystal display panel tilts from the vertical direction. In FIG. 14 the same reference numerals as those used in FIGS. 1, 2, and 13 denote the same or corresponding parts, which will not described below.

In the Comparative Example 2, in the conventional reflective liquid crystal display device, by tilting the light exiting from the front light from the vertical direction, the light is reflected by the bottom surface 15a of the light-guiding plate 15 and the top surface 12c of the upper substrate 12a of the liquid crystal display panel 11 in a direction which is tilted from the vertical direction (which is the visual recognition direction) in order to make it possible to reduce the effect of the reflected light in the visual recognition direction. As shown in FIG. 4, it can be seen that when the angle distribution of the light exiting from the front light is taken into consideration, there is a steep decrease in the brightness at the side of a light-incident surface 15c of the light-guiding plate 15. In order to decrease the amount of light reflected in the visual recognition direction, an angle α of a reflecting surface S1 of the light-guiding plate 15 (in the direction opposite to the incident surface 15c) is made even smaller in order for the light to exit therefrom, thereby making it possible to tilt the light having the peak brightness from the visual recognition direction.

However, even when the reflecting surface 13 of the liquid crystal display panel 11 is a surface nearly like a mirror surface with almost no scattering properties, even the image-information-carrying light reflected by the reflecting surface 13 is hardly reflected in the visual recognition direction. This considerably reduces the brightness of the display in the visual recognition direction, so that the display becomes dark. In order to increase the brightness, it is necessary to form a structure in which the reflecting surface 13 of the liquid crystal display panel 11 is provided with a scattering property, so that the light is also reflected in a direction perpendicular to the top surface 12c of the upper substrate 12a. However, at an ordinary scattering reflecting surface, the light is scattered, with the regular reflection direction as a central direction. Therefore, in order to cause the light to be reflected in the vertical direction, it is necessary to form the reflecting surface 13 so that it can scatter light greatly. As a result, the component of the light which undergoes scattered reflection in directions other than the vertical direction with respect to the top surface 12c becomes large. This not only reduces the brightness, but also produces a dark display because the light at the peak value of the brightness-angle distribution is not in the vertical direction.

Figure 15:
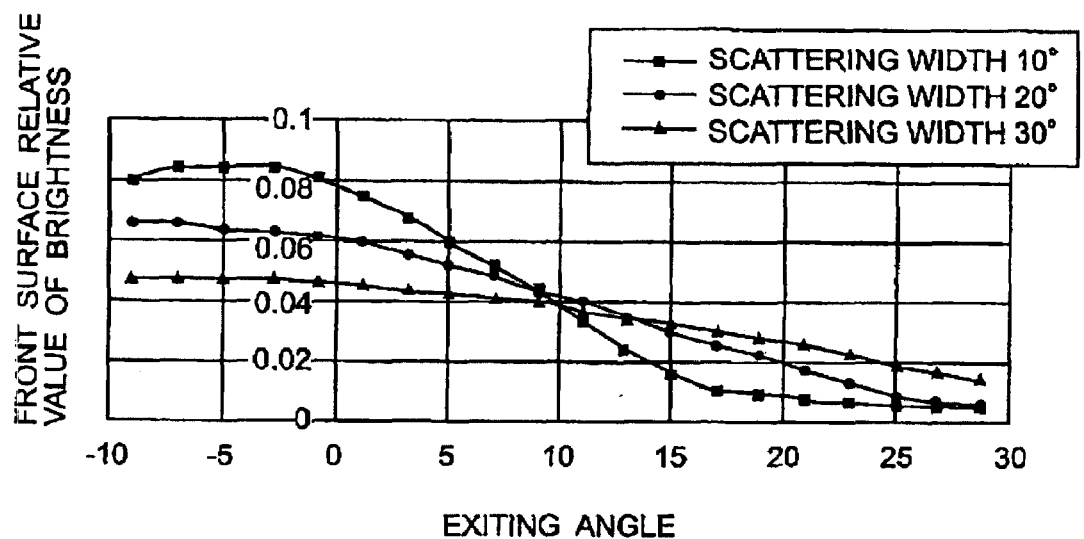
FIG. 15 is a graph showing the relationship between the exiting angle of light from a front light and the brightness in a visual recognition direction.
Figure 16:
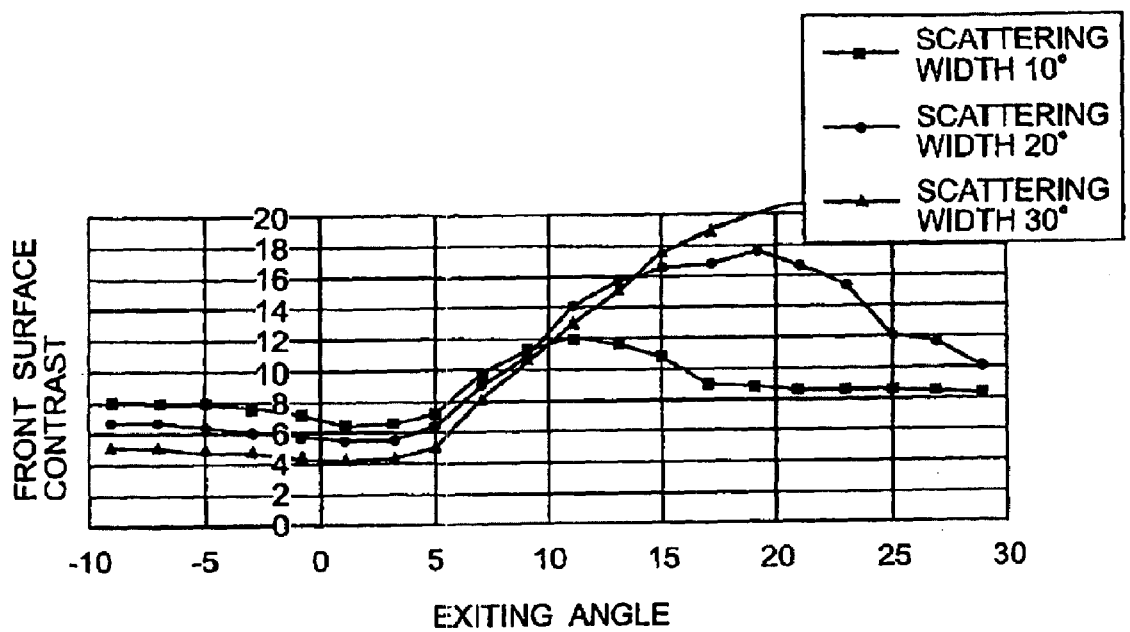
FIG. 16 is a graph showing the relationship between the exiting angle of the light from the front light and the contrast in the visual recognition direction.
Figure 17:
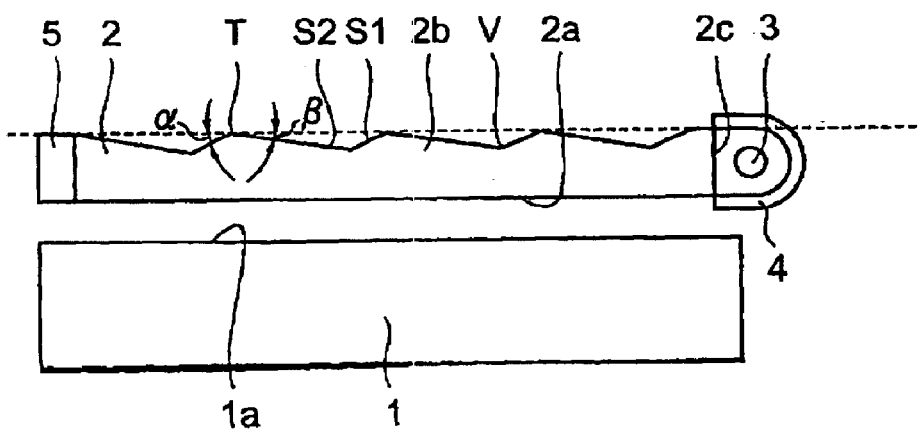
FIG. 17 schematically illustrates the structure of another conventional reflective liquid crystal display device.

FIG. 15 is an illustration of a plot of the calculation based on a simulation of the brightness relative values in the vertical direction (which is the visual recognition direction) in terms of the exiting angle of the light from the front light, in the case where there is used a scattering plate provided at the reflecting surface 13 of the liquid crystal display panel 11 of FIG. 14 so as to uniformly scatter light in the ranges of ±10 degrees, ±20 degrees, and ±30 degrees, with the regular reflecting direction being a central direction. FIG. 16 is an illustration of a plot of the calculation based on a simulation of the contrast in the vertical direction (which is the visual recognition direction) in terms of the exiting angle of the light from the front light, in the case where there is used a scattering plate provided at the reflecting surface 13 of the liquid crystal display panel 11 of FIG. 14 so as to uniformly scatter light in the ranges of ±10 degrees, ±20 degrees, and ±30 degrees, with the regular reflecting direction being a central direction.

Considering the simulation results of FIGS. 15 and 16 and the above-described comparative examples, the following conclusion has been reached.

From FIGS. 15 and 16, it can be seen that when the exiting angle of light from the front light becomes equal to or greater than 5 degrees, the contrast increases, and that when the exiting angle becomes of the order of 10 degrees, the light reflected at the top surface 12c of the upper substrate 12a that is in a direction perpendicular to the upper surface 12c becomes sufficiently small, so that contrast is sufficiently increased. In other words, when the direction of the light reflected at the top surface 12c and the visual recognition direction can be separated by 10 degrees or more, sufficient contrast can be obtained. The greater the scattering property of the reflecting surface 13 of the liquid crystal display panel 11, the greater this effect is, even in the case where the exiting angle of light from the front light is large. It can be understood that the exiting angle is of the order of 10 degrees for a scattering reflecting surface having a scattering width of 10 degrees, and that the exiting angle is of the order of 20 degrees for a scattering reflecting surface having a scattering width of 20 degrees, so that the contrast becomes a maximum when the scattering width of the scattering reflecting surface is substantially the same as the exiting angle.

In contrast, it can be understood that the larger the exiting angle of light from the front light, the more the brightness is reduced even when a reflecting plate which scatters light greatly is used. Accordingly, in order to obtain a display that is bright and that has a high contrast, the direction of reflection of undesired light not carrying image information which has been reflected by the top surface 12c of the upper substrate 12a of the liquid crystal display panel 11 and the bottom surface 15a of the light-guiding plate 15 and the direction of reflection of the light carrying image information which has passed through a liquid crystal layer 14 of the liquid crystal display panel 11 and which has been reflected by the reflecting surface 13 need to be separated by an angle of 10 degrees or more, and the direction of reflection of light reflected by the reflecting surface 13 of the liquid crystal display panel 11 needs to be set close to the vertical direction.

As can be understood from the foregoing description, in the reflective liquid crystal display devices of the first and second embodiments, the separation angle needs to be equal to or greater than 10 degrees in order to increase contrast, and, as shown in FIG. 3, it is preferable that the tilt angle δ be 3 degrees or more so as obtain a separation angle of approximately 10 degrees or more.

In the reflective liquid crystal display device of the second embodiment, as shown in FIG. 11, when the tilt angle δ of the tilted surfaces 21b of the prism array 21 is equal to or less than 45 degrees, the case that all of the light incident upon the prism array 21 is lost does not occur. By setting the tilt angle δ as small as possible, the proportion of the exiting light from the front light that is incident upon the tilted surfaces (represented by the arrow 19b) becomes high. In other words, the proportion of the image-information-carrying reflected light (represented by the arrow 19d) at the reflecting surface 13 that can be made to exit in a direction perpendicular to the top surface 12c of the upper substrate 12a is increased, thereby making it possible to provide a reflective liquid crystal display device which uses light with high efficiency.

Therefore, by causing the tilt angle δ of the tilted surfaces 21b of the prism array 21 to be in the range of from 3 to 45 degrees, it is possible to provide a reflective liquid crystal display device which provides high contrast and which uses light with high efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reflective liquid crystal display device comprising:
   a light source;
   a light-guiding plate, in which light from the light source is received at a side surface of the light-guiding plate, and in which the light exits from a bottom surface of the light-guiding plate;
   a reflective liquid crystal display panel disposed parallel to and opposing the bottom surface of the light-guiding plate, the reflective liquid crystal display panel having an upper substrate, a lower substrate, and a liquid crystal layer sandwiched between the upper substrate and the lower substrate; and
   a deflecting device for deflecting light which has exited from the bottom surface of the light-guiding plate, and located at a top surface side of the upper substrate of the reflective liquid crystal display panel, wherein the deflecting device includes at least one surface at a light source side substantially perpendicular to the top surface of the upper substrate of the reflective liquid crystal display panel, and at least one tilted surface that tilts towards a side opposite the light source, from a crest line of the at least one substantially perpendicular surface at an angle, with respect to an imaginary surface which passes through the crest line and which is parallel to the top surface of the upper substrate.

2. The reflective liquid crystal display device according to claim 1, wherein tilt angle of the tilted surface of the deflecting device is substantially equal to an exiting angle, with respect to a direction perpendicular to the bottom surface, and the light exiting from the bottom surface of the light-guiding plate at the exiting angle has a peak brightness.

3. The reflective liquid crystal display device according to claim 1, wherein the deflecting device is coated with anti-reflection layer.

4. The reflective liquid crystal display device according to claim 1, wherein the deflecting device includes a plurality of the surfaces at a light-source side, substantially perpendicular to the top surface of the upper substrate of the reflective liquid crystal display panel, and a plurality of the tilted surfaces that tilt towards a side opposite to the light source from crest lines of the corresponding substantially perpendicular surfaces at an angle with respect to the imaginary surface which passes through the crest lines of the corresponding substantially perpendicular surfaces and which is parallel to the top surface of the upper substrate.

5. The reflective liquid crystal display device according to claim 4, wherein tilt angles of the tilted surfaces of the deflecting device are substantially equal to an exiting angle, with respect to a direction perpendicular to the bottom surface, and the light exiting from the bottom surface of the light-guiding plate at the exiting angle has a peak brightness.

6. reflective liquid crystal display device according to claim 4, wherein the tilt angles of the tilted surfaces of the deflecting device are in a range of from 3 degrees to 45 degrees.

7. The reflective liquid crystal display device according to claim 4, wherein the deflecting device comprises an array of prisms separated by gaps and the gaps are narrower than gaps between pixels of the reflective liquid crystal display panel.

8. The reflective liquid crystal display device according to claim 4, wherein the deflecting device is coated with an anti-reflection layer.

9. A reflective liquid crystal display device comprising:
   a reflective liquid crystal display panel having an upper substrate, a lower substrate, and a liquid crystal layer sandwiched between the upper substrate and the lower substrate; and
   a deflecting device for deflecting light incident from a top surface side of the upper substrate, and located at the top surface side of the upper substrate of the reflective liquid crystal display panel, wherein the deflecting device includes at least one surface at a light source side substantially perpendicular to the top surface of the upper substrate of the reflective liquid crystal display panel, and at least one tilted surface that tilts towards a side opposite a light source, from a crest line of the at least one substantially perpendicular surface at an angle, with respect to an imaginary surface which passes through the crest line and which is parallel to the top surface of the upper substrate.

10. The reflective liquid crystal display device according to claim 9, wherein tilt angle of the tilted surface of the deflecting device is substantially equal to an exiting angle, with respect to a direction perpendicular to the bottom surface, and the light exiting from the bottom surface of the light-guiding plate at the exiting angle has a peak brightness.

11. The reflective liquid crystal display device according to claim 9, wherein the deflecting device is coated with an anti-reflection layer.

12. The reflective liquid crystal display device according to claim 9, wherein the deflecting device includes a plurality of the surfaces at a light-source side, substantially perpendicular to the top surface of the upper substrate of the reflective liquid crystal display panel, and a plurality of the tilted surfaces that tilt towards a side opposite to the light source from crest lines of the corresponding substantially perpendicular surfaces at an angle with respect to the imaginary surface which passes through the crest lines of the corresponding substantially perpendicular surfaces and which is parallel to the top surface of the upper substrate.

13. The reflective liquid crystal display device according to claim 12, wherein tilt angles of the tilted surfaces of the deflecting device are substantially equal to an exiting angle, with respect to a direction perpendicular to the bottom surface, and the light exiting from the bottom surface of the light-guiding plate at the exiting angle has a peak brightness.

14. The reflective liquid crystal display device according to claim 12, wherein the tilt angles of the tilted surfaces of the deflecting device are in a range of from 3 degrees to 45 degrees.

15. The reflective liquid crystal display device according to claim 12, wherein the deflecting device comprises an array of prisms separated by gaps and the gaps are narrower than gaps between pixels of the reflective liquid crystal display panel.

16. The reflective liquid crystal display device according to claim 9, wherein the deflecting device is coated with an anti-reflection layer.

* * * * *